United States Patent
Robertson

(10) Patent No.: US 7,984,665 B1
(45) Date of Patent: Jul. 26, 2011

(54) HOT STICK SWITCH HEAD

(76) Inventor: Kenny D. Robertson, Jena, LA (US)

( * ) Notice: Subject to any disclaimer, the term of this patent is extended or adjusted under 35 U.S.C. 154(b) by 147 days.

(21) Appl. No.: 12/410,548

(22) Filed: Mar. 25, 2009

(51) Int. Cl.
*B25B 27/14* (2006.01)
*H01R 11/12* (2006.01)

(52) U.S. Cl. .......................................... 81/53.1; 81/3.8

(58) Field of Classification Search ................... 81/53.1, 81/3.8, 53.11, 176.3; 294/19.1
See application file for complete search history.

(56) References Cited

U.S. PATENT DOCUMENTS

| | | | |
|---|---|---|---|
| 1,672,477 A * | 6/1928 | Tipsord et al. .................... | 81/3.8 |
| 2,172,143 A | 9/1939 | Lemmon | |
| 2,233,826 A * | 3/1941 | Allison ........................ | 81/53.1 |
| 2,235,666 A | 3/1941 | Birkenmaier | |
| 2,365,113 A | 12/1944 | Schultz | |
| 2,473,008 A * | 6/1949 | Davis et al. .................... | 81/53.12 |
| 2,703,349 A | 3/1955 | Sant | |
| 2,742,804 A * | 4/1956 | Chase et al. ................... | 81/176.3 |
| 2,936,193 A | 5/1960 | Mannen | |
| 3,374,329 A | 3/1968 | Bronikowski | |
| 3,788,691 A * | 1/1974 | McMullin ...................... | 81/53.1 |
| 3,810,060 A | 5/1974 | Hubbard | |
| 4,307,369 A | 12/1981 | Jackson, Jr. | |
| 4,313,100 A | 1/1982 | Schmunk | |
| 4,414,527 A | 11/1983 | Biller | |
| 4,582,352 A * | 4/1986 | Filter et al. .................... | 294/19.1 |
| 4,636,764 A | 1/1987 | Mee et al. | |
| 5,532,668 A | 7/1996 | Fennell | |
| 5,564,852 A | 10/1996 | Maxwell et al. | |
| 5,593,196 A | 1/1997 | Baum et al. | |
| 5,742,220 A | 4/1998 | Scherer | |
| 6,518,871 B2 | 2/2003 | Fennell | |
| 6,725,745 B1 | 4/2004 | Palmieri | |
| 7,181,995 B2 | 2/2007 | Rider | |
| 7,291,161 B2 * | 11/2007 | Hooven ........................ | 606/205 |
| 2002/0011916 A1 | 1/2002 | Fennell | |
| 2002/0139225 A1 * | 10/2002 | Carter ........................ | 81/176.3 |
| 2006/0150779 A1 | 7/2006 | Rider | |
| 2007/0119608 A1 | 5/2007 | Morris et al. | |
| 2007/0291442 A1 | 12/2007 | Steinbrecher et al. | |
| 2008/0129314 A1 | 6/2008 | Ricci et al. | |

* cited by examiner

*Primary Examiner* — Hadi Shakeri
(74) *Attorney, Agent, or Firm* — Jones, Walker, Waechter, Poitevent, Carrere & Denegre, L.L.P.

(57) ABSTRACT

A hot stick switch head is described and shown in the specification and drawings having a body, a jaw assembly attached to the top end of the body, and a base attached to the bottom end of the body. The base is adapted to be attached to an insulated pole or "hot stick." The body has a channel extending longitudinally along at least a portion of the body. The jaw assembly has an open position and a closed position for securing high-voltage fuses, fuse barrel assemblies, or other similar or related devices during removal and installation.

6 Claims, 9 Drawing Sheets

Figure 1 – Prior Art

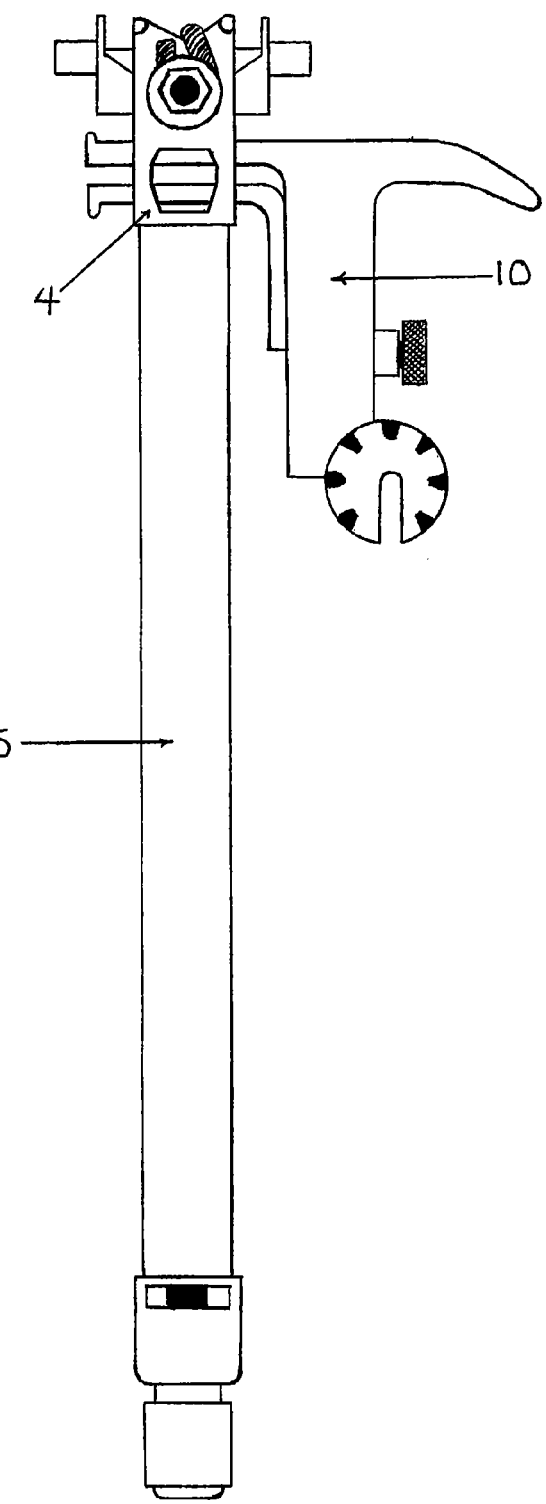

HOT STICK SWITCH HEAD

I. BACKGROUND

A. Technical Field

An embodiment disclosed herein is generally directed to a hot stick switch head for securing high-voltage fuses, fuse barrel assemblies, or other similar or related devices during removal and installation.

B. Background Art

The present invention relates to a tool used to remove and replace electrical fuses and/or other related devices commonly used in electrical transmission and distribution systems. As detailed in U.S. Pat. No. 6,725,745 to Palmieri, single-phase and three-phase electrical power is delivered to commercial, industrial, and residential users through a system known as the power distribution grid, which generally includes such components as generating plants, transformers, and electrical power lines. These lines generally consist of both transmission lines, which typically have AC voltages in the range of about 70,000 to about 750,000 volts, and distribution lines, which typically have AC voltages in the range of about 2,300 to about 50,000 volts. Inevitably, there is an element of danger in working with these high voltages, yet there are many instances in which utility workers have to either service or repair these high voltage power lines in the performance of their duties. These service and repair duties often include the replacement of power line fuses, which, when operable, can carry hundreds of amps of electrical current and, even when inoperable, these fuses may be in an energized circuit carrying thousands of volts of electricity, which may still be available at the load side of the fuse.

Generally, power line fuses are located at or near the tops of power poles, which can place these fuses over 30 feet above the surface of the ground, and each fuse is generally carried in a fuse holder commonly referred to as a "fuse barrel assembly," which is used to provide an interface between the fuse and the fuse block, which is connected to the power line. Generally, the bottom end of the fuse barrel assembly has a hinge assembly that is comprised of an ejection assembly (for "automatically" releasing the top end of a blown fuse from a fuse block) and a pair of pivot pins (one pin on each side of the hinge assembly) that are adapted to fit into slots formed on the bottom of the fuse block. This bottom portion of the fuse block is commonly referred to as a "fuse block saddle." Generally, the top end of the fuse barrel assembly has a hoop, a pull-ring, or some other similar structure, and the hinge assembly has a slot, and both allow for the insertion of an arm (or bar) portion of a switch head tool through the hoop or slot so that the fuse barrel assembly can be manipulated by the switch head tool. This manipulation or handling of the fuse barrel assembly includes, but is not limited to, carrying the fuse barrel assembly to and from the fuse block saddle, and inserting the top end of the fuse barrel assembly into (and/or removing the top end of the fuse barrel assembly from) the top end of the fuse block, which is commonly referred to as the "fuse block switch." Briefly stated, the insertion and removal of the fuse barrel assembly from the fuse block switch is accomplished by rotating the top end of the fuse barrel assembly about the pivot point defined by the pivot pins and the slots on the fuse block saddle. In other words, after the hinge assembly is properly seated in the fuse block saddle, the fuse barrel assembly is supported by the fuse block saddle and is free to be rotated about the pivot point. This allows the top end of the fuse barrel assembly to be rotated into the fuse block switch in order to insert the fuse into the electrical circuit that it is a part of, or alternatively the top end of the fuse barrel assembly can be rotated away from the fuse block switch to remove the fuse from its electrical circuit, in which case the fuse tool can be inserted through the hinge assembly slot and used to both lift the fuse barrel assembly from the fuse block saddle, and then carry the fuse barrel assembly to the ground for servicing or replacement.

Oftentimes these fuses have to be replaced during inclement weather conditions including heavy rains and high winds. Generally, the prior art switch heads used for replacing fuses are comprised of fittings attached to insulated extension poles and have one or two prongs, arms, and/or hooks that are used for, among other functions, carrying and manipulating the fuse barrel assembly into, and/or out of, the fuse block. FIG. 1 illustrates a prior art switch head configured with a single extension arm. Many of these prior art switch heads, however, do not have a means for securing a fuse barrel assembly to the switch head while being manipulated. This can lead to the extremely dangerous condition of the fuse barrel assembly becoming separated from the switch head and hurtling a considerable distance to the ground causing serious personal injuries and significant property damage. Moreover, this dangerous condition becomes even more likely during inclement weather conditions.

II. BRIEF DESCRIPTION OF THE SEVERAL VIEWS OF THE DRAWINGS

FIG. 11 is a side elevation of an embodiment of the invention engaging a fuse barrel assembly.

III. DETAILED DESCRIPTION OF THE EMBODIMENTS DEPICTED IN THE DRAWINGS

It should also be understood that the specific devices illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 1:
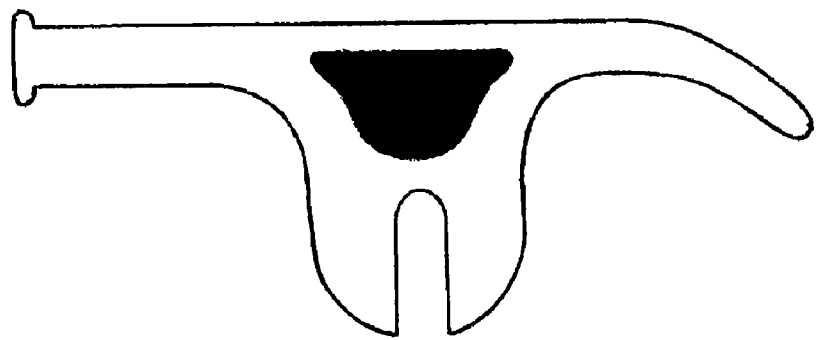
FIG. 1 is a side elevation of a prior art hot stick switch head.
Figure 2:
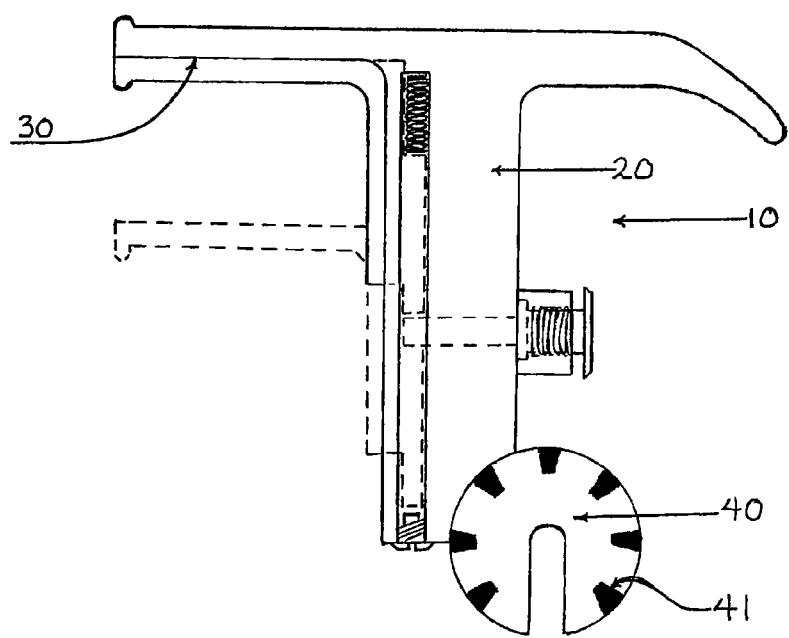
FIG. 2 is a side elevation of an embodiment of the invention.

An embodiment disclosed herein provides a hot stick switch head capable of securing a fuse barrel assembly to the switch head while the fuse barrel assembly is being manipulated. FIG. 1 illustrates a prior art switch head configured with a single extension arm. Referring to an embodiment of the present invention as shown in FIG. 2, the hot stick switch head 10 has a body 20, a jaw assembly 30, and a base 40. The jaw assembly 30 is attached to the top end of the body 20, while the base 40 is attached to the bottom end of the body 20. The base 40 further comprises a swivel 41 for universal attachment to an insulated pole.

Figure 3:
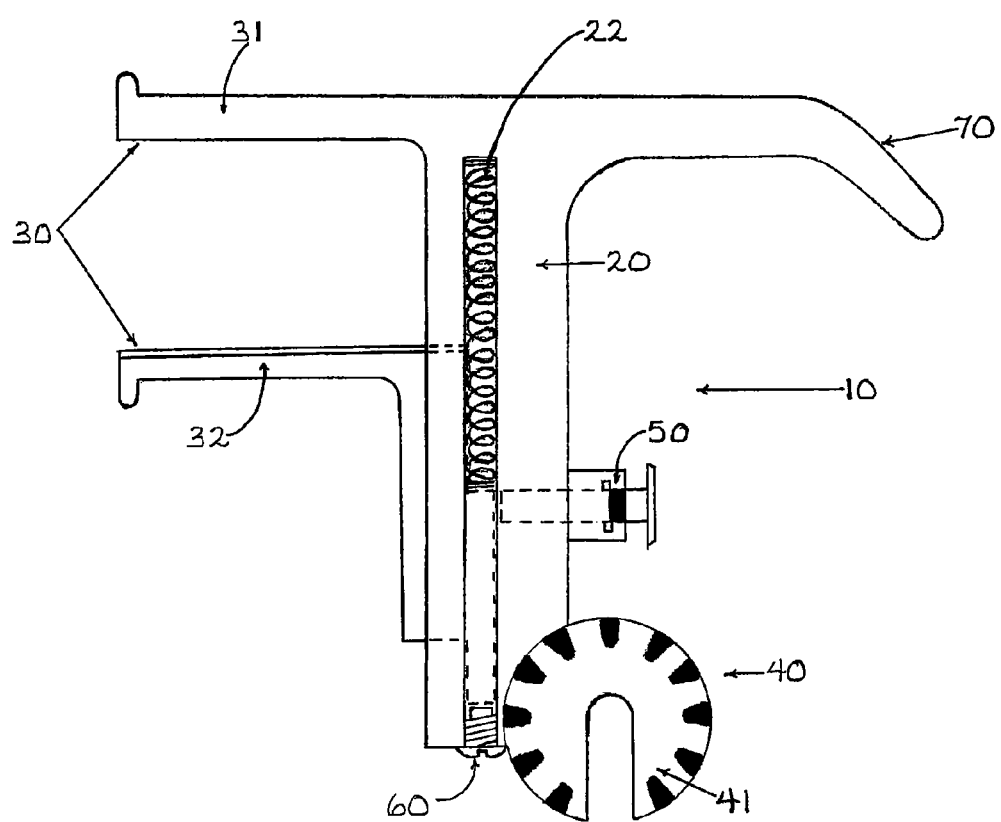
FIG. 3 is a side elevation of an embodiment of the invention showing the jaw assembly in its "open" position.
Figure 4:
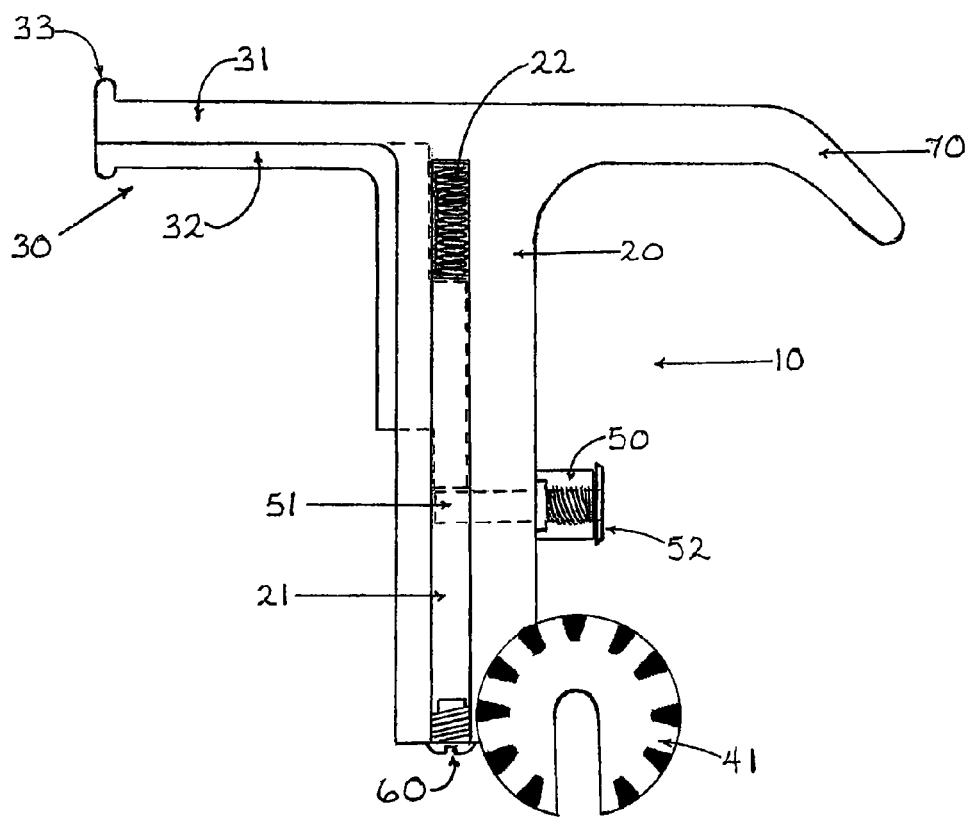
FIG. 4 is a side elevation of an embodiment of the invention showing the jaw assembly in its "closed" position.

Now referring to FIG. 3, the jaw assembly 30 has a fixed jaw 31 and a movable jaw 32 extending perpendicularly from the body 20. The jaw assembly has an open position and a closed position. The jaw assembly is in the open position when the fixed jaw 31 and the movable jaw 32 are spaced apart as shown in FIG. 3. The jaw assembly is in the closed position when the fixed jaw 31 and the movable jaw 32 are in contact as shown in FIG. 4. When in the closed position, the jaw assembly 30 can be cylindrical in shape such that the jaw assembly 30 can be inserted through a fuse ring 4. In other embodiments, the jaw assembly 30 can be square, rectangular, or any other suitable shape. Also, in another embodiment, the fixed jaw 31 and the movable jaw 32 each have a flared tip 33, thereby creating a lip to further secure the fuse barrel assembly on the hot stick switch head 10.

Figure 5:
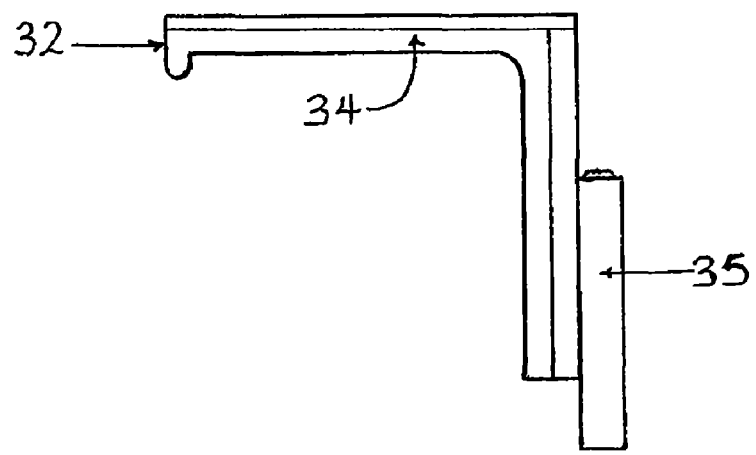
FIG. 5 is a side elevation of the movable jaw.
Figure 6:
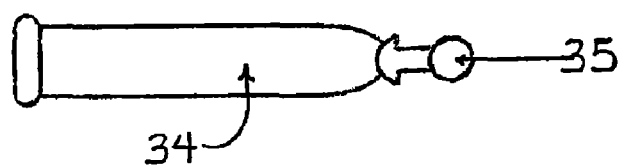
FIG. 6 is a bottom elevation of the movable jaw.

As depicted in FIGS. 5 and 6, the movable jaw 32 has a first portion 34 and a second portion 35. The first portion 34 is an extension arm which is capable of engaging a fuse barrel assembly by extending through the fuse ring 4 (See FIG. 11). The second portion 35 is adapted to slidably engage channel 21 of the body 20 (See FIG. 4). The channel 21 extends longitudinally along at least a portion of the body 20. In the embodiment depicted in FIG. 5, the second portion 35 is substantially cylindrical in shape. In the embodiment depicted in FIGS. 2-4, Channel 21 is bored in a cylindrical shape extending longitudinally from the bottom of the body 20, such that, once engaged, the movable jaw 32 can move longitudinally within the channel 21. One of skill in the art should appreciate that the second portion 35 and the channel 21 can be formed in various geometric shapes in other embodiments.

Referring to FIGS. 3 and 4, a movable jaw stop 60 can be attached to the bottom end of channel 21 to prevent the movable jaw from sliding out of the channel. The movable jaw stop 60 can comprise a set screw, a weld tack, a pin, a plug, or any other means to close the bottom opening of the channel.

Still referring to FIGS. 3 and 4, another embodiment of the hot stick switch head utilizes a force means for moving the jaw assembly from the closed position to the open position. The force means may include a spring 22, a pneumatic cylinder (not shown), or similar component which is capable of asserting an axial force on the movable jaw 32, thereby biasing the jaw assembly to be in the open position. If a compression spring is utilized, the compression spring is set at the top end of the channel 21. When the jaw assembly is brought to the closed position, the compression spring is compressed, thereby asserting an axial force in a downward direction on the movable jaw 32. Conversely, if a tension spring is utilized, the tension spring is placed at the bottom end of the channel 21 and connected to the movable jaw. When the jaw assembly is brought to the closed position, the tension spring is extended, thereby asserting an axial force in a downward direction on the movable jaw 32.

Figure 7:
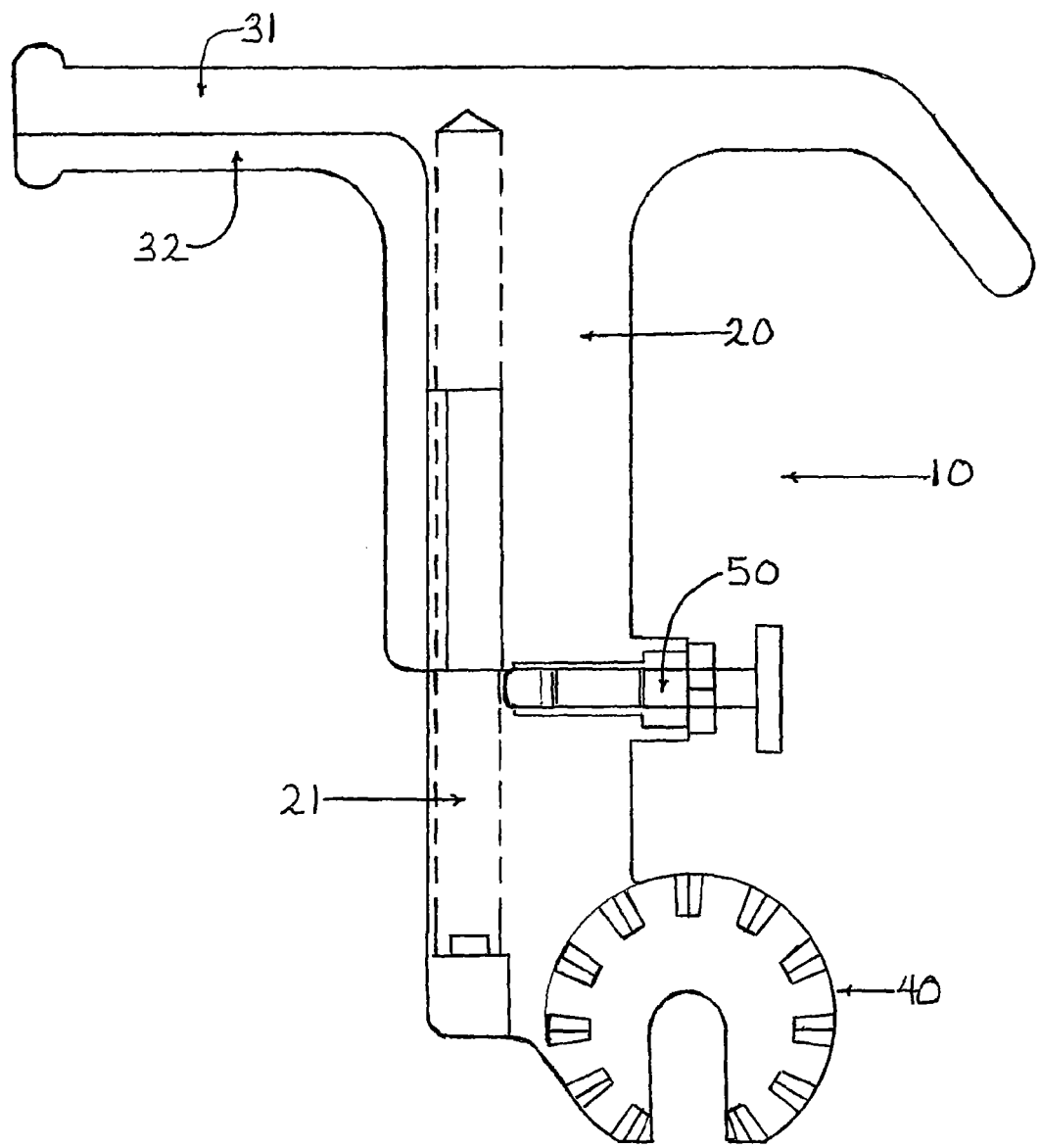
FIG. 7 is a partial cutaway side elevation of an embodiment of the invention showing the pin assembly extending through the body of the hot stick switch head.
Figure 8:
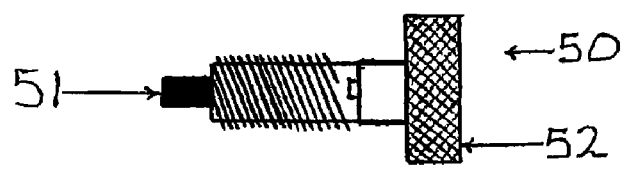
FIG. 8 is a side elevation of the pin assembly in the engaged position.
Figure 9:
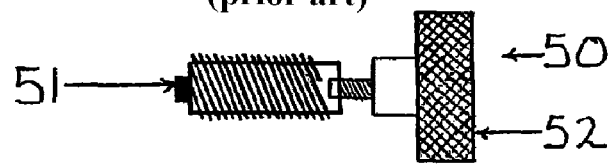
FIG. 9 is a side elevation of the pin assembly in the disengaged position.

In another embodiment, a locking means is attached to the body to lock the jaw assembly in the closed position. (See FIGS. 3, 4, & 7) The locking means can be a pin assembly 50. The pin assembly 50, as shown in detail in FIGS. 8 and 9, comprises a retractable, spring-loaded pin 52 that can be withdrawn and engaged via a knob 52. An exemplar pin assembly 50 is the "Knurled Knob Steel Non-Locking Plunger" sold by Vlier, Inc. The pin assembly 50 is biased to extend through the body 20 and into the channel 21 of the hot stick switch head. While the jaw assembly 30 is in the open position, the movable jaw 32's presence within the channel 21 impedes the pin assembly 50 from engaging. When the jaw assembly 30 is brought to the closed position, the pin assembly 50 can automatically engage (i.e., the pin extends across the channel 21). Once engaged, the movable jaw 32's longitudinal movement within the channel of the body 20 is obstructed, thereby locking the jaw assembly 30 in the closed position. The pin assembly can then be manually disengaged by the user by pulling on the knob 52, allowing the movable jaw 32 to return to the open position.

All of the major components 20, 30, and 40 of the hot stick switch head 10 can be fabricated from any metallic or semi-metallic material, including but not limited to, aluminum, bronze, brass, and stainless steel. Other suitable materials include polymers, plastics, thermoplastics, composite fibers, or any other suitable material. In an embodiment, the body 20, the jaw assembly 30, and base 40, as well as most of the other hot stick switch head components, are cast formed, whereby a single cast is used for the body 20, fixed jaw 31, and base 40, and a separate cast is used for the movable jaw 32. In other embodiments, the body 20, the jaw assembly 30, and base 40 can be formed by any other suitable fabrication method or technique appropriate for the material being used, including, but not limited to, precision machining or multiple castings, e.g., separate castings of the body 20, the base 40, the fixed jaw 31, and the movable jaw 32, in which case the separately cast pieces can by welded together, have integral threads, or can be connected together by fasteners or any other suitable method or means.

Figure 10:
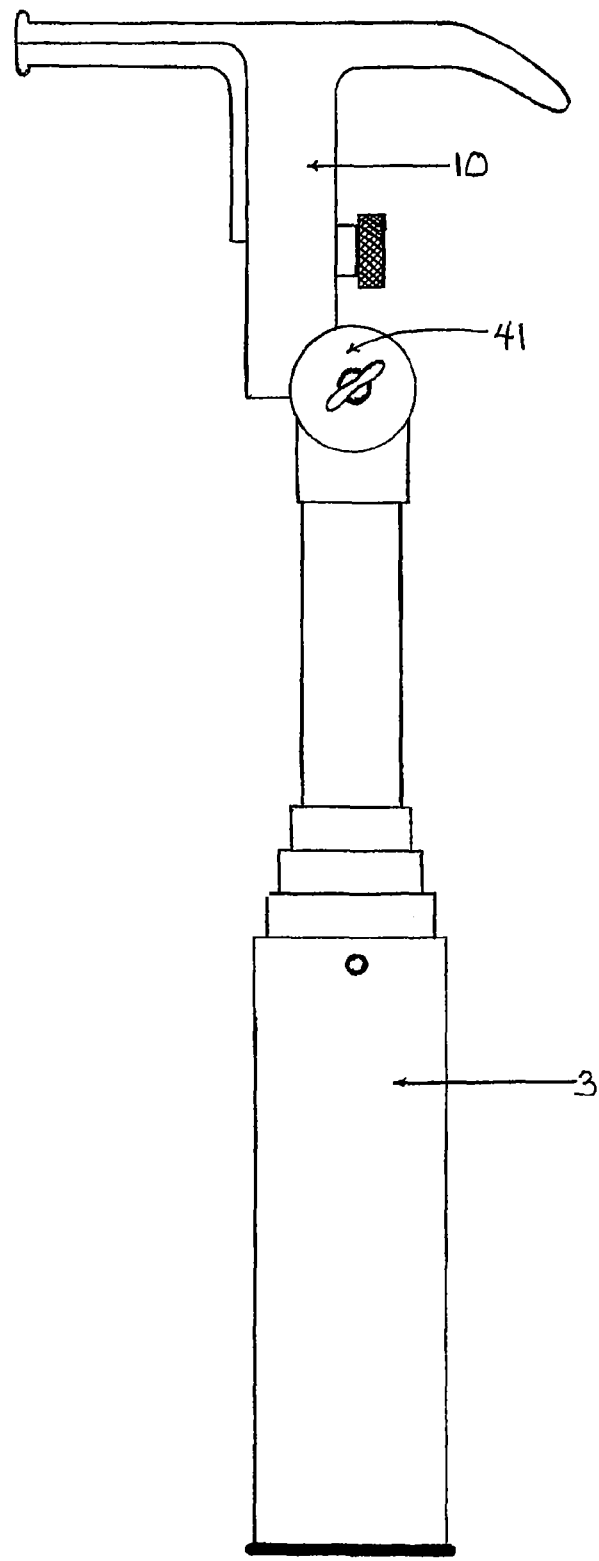
FIG. 10 is a side elevation of an embodiment of the invention attached to an insulated pole.

In operation, the hot stick switch head 10 can be used to safely remove and replace a fuse barrel assembly. As shown in FIGS. 10 and 11, the hot stick switch head 10 is attached to an insulated pole 3 (i.e., a telescoping hot stick) in order to remove a blown fuse barrel assembly. With the jaw assembly locked in the closed position (i.e., with the pin assembly 50 engaged), the hot stick switch head is used to disconnect the fuse barrel assembly 5 from the fuse block switch. The jaw assembly 30 of the hot stick switch head is then inserted into fuse ring 4 in order to remove the fuse barrel assembly 5 from the fuse block saddle and carry the fuse barrel assembly 5 to the ground.

Once the blown fuses are replaced, the jaw assembly 30, while still in the closed position, is inserted into the fuse ring 4. The pin assembly 50 is then disengaged by the user by pulling on the pin assembly's knob 52, thereby allowing the jaw assembly 30 to return to the open position. Because the jaw assembly 30 is biased to be in the open position by a spring 22 located within the channel 21 of the body 20, the fixed jaw 31 and the movable jaw 32 contact opposite ends of the inner wall of the fuse ring 4, each exerting a force on the inner wall surface of the fuse ring 4. This force secures the fuse barrel assembly on the hot stick switch head 10, thereby preventing the fuse barrel assembly from separating from the hot stick switch head. Once the fuse barrel assembly is secured on the hot stick switch head, the fuse barrel assembly 5 can be safely raised and seated in the fuse block saddle.

In order to remove the hot stick switch head 10 from the fuse ring 4, the user causes the jaw assembly 30 to return to the closed position by exerting a downward force on the insulated pole 3 sufficient to overcome the axial force being exerted by the spring 22. The pin assembly 50 then automatically engages, locking the jaw assembly 30 in the closed position. The hot stick switch head can then be removed and used to insert the top end of fuse barrel assembly 5 into the fuse block switch.

The embodiments shown in the drawings and described above are exemplary of numerous embodiments that may be made within the scope of the appended claims. It is contemplated that numerous other configurations may be used, and the material of each component may be selected from numerous materials other than those specifically disclosed. In short, it is the applicant's intention that the scope of the patent issuing herefrom will be limited only by the scope of the appended claims.

I claim:

1. A hot stick switch head, comprising:
    a. a body having a top end and a bottom end, the body further comprising a channel extending longitudinally along at least a portion of the body;
    b. a jaw assembly comprising a fixed jaw and a movable jaw, the fixed jaw attached to the body and extending perpendicularly therefrom, the movable jaw housed within the body's channel and extending perpendicularly therefrom, wherein the movable jaw is capable of moving vertically within the channel to define an open position and a closed position;
    c. a spring positioned within the body's channel and engaging the movable jaw to bias the jaw assembly into the open position;
    d. a base attached to the bottom end of the body, the base adapted to be attached to an insulated pole;
    e. a means for locking the jaw assembly in the closed position; and
    f. a hook member attached to the top end of the body, the hook member extending from the body in substantially an opposite direction of the jaw assembly.

2. The hot stick switch head of claim 1, wherein the means for locking the jaw assembly in the closed position comprises a pin assembly attached to the body, the pin assembly further comprising a pin, the pin biased to extend into the channel.

3. The hot stick switch of claim 2, further comprising a movable jaw stop.

4. A hot stick switch head, comprising:
    a. a body having a top end and a bottom end, the body further comprising a channel extending longitudinally along at least a portion of the body;
    b. a jaw assembly, the jaw assembly having an open position and a closed position, the jaw assembly further comprising a fixed jaw and a movable jaw, the fixed jaw attached to the body, the movable jaw slidably engaging the channel of the body;
    c. a spring located within the channel of the body, the spring biasing the jaw assembly to be in the open position;
    d. a pin assembly attached to the body, the pin assembly comprising a pin, the pin biased to extend into the channel;
    e. a base attached to the bottom end of the body, the base adapted to be attached to an insulated pole; and
    f. a hook member attached to the top end of the body, the hook member extending from the body in substantially an opposite direction of the jaw assembly.

5. A hot stick switch head, comprising:
    a. a body having a top end and a bottom end, the body comprising a channel extending longitudinally from the bottom end of the body;
    b. a jaw assembly comprising:
        i. a fixed jaw attached to the top end of the body and extending perpendicularly therefrom; and
        ii. a movable jaw defining a first portion and a second portion, the first portion extending perpendicularly from the body such that the first portion is generally parallel to the fixed jaw, the second portion mated to the channel such that the movable jaw is capable of moving longitudinally within the channel to define an open position and a closed position, wherein the movable jaw is adjacent to the fixed jaw when in the closed position; and
    c. a spring located within the channel of the body, the spring engaging the movable jaw's second portion to bias the jaw assembly into the open position;
    d. a means for locking the jaw assembly in the closed position; and
    e. a hook member attached to the top end of the body, the hook member extending from the body in substantially an opposite direction of the jaw assembly.

6. The hot stick switch head of claim 5, wherein the means for locking is a pin assembly attached to the body, the pin assembly further comprising a pin, the pin biased to extend into the channel.

* * * * *